United States Patent
Otte et al.

(10) Patent No.: US 8,831,618 B2
(45) Date of Patent: Sep. 9, 2014

(54) APPARATUS AND METHOD TO PERFORM FAST NEIGHBOR LIST SEARCH DURING A TRANSFER TO A DIFFERENT RAT TARGET SYSTEM

(75) Inventors: Kurt William Otte, Erie, CO (US); Masakazu Shirota, Kanagawa (JP)

(73) Assignee: QUALCOMM Incorporated, San Diego, CA (US)

( * ) Notice: Subject to any disclaimer, the term of this patent is extended or adjusted under 35 U.S.C. 154(b) by 555 days.

(21) Appl. No.: 12/836,504

(22) Filed: Jul. 14, 2010

(65) Prior Publication Data

US 2011/0014919 A1 Jan. 20, 2011

Related U.S. Application Data

(60) Provisional application No. 61/225,630, filed on Jul. 15, 2009.

(51) Int. Cl.
*H04W 36/00* (2009.01)
*H04W 92/24* (2009.01)

(52) U.S. Cl.
CPC .......... *H04W 36/0061* (2013.01); *H04W 92/24* (2013.01); *H04W 36/0088* (2013.01); *H04W 36/0066* (2013.01)
USPC .......................................... 455/442; 370/332

(58) Field of Classification Search
USPC ............................ 455/436–444; 370/331–334
See application file for complete search history.

(56) References Cited

U.S. PATENT DOCUMENTS

| | | | |
|---|---|---|---|
| 2003/0081571 A1* | 5/2003 | Hur | 370/331 |
| 2005/0068917 A1 | 3/2005 | Sayeedi | |
| 2009/0268690 A1* | 10/2009 | Sebire | 370/332 |
| 2010/0195568 A1* | 8/2010 | Iimori | 370/328 |
| 2010/0317348 A1* | 12/2010 | Burbidge et al. | 455/436 |
| 2010/0317378 A1* | 12/2010 | Fang et al. | 455/466 |

FOREIGN PATENT DOCUMENTS

| | | |
|---|---|---|
| CN | 1853425 A | 10/2006 |
| CN | 101341682 A | 1/2009 |
| JP | 2011508496 A | 3/2011 |
| JP | 2011520312 A | 7/2011 |

(Continued)

OTHER PUBLICATIONS

Alcatel-Lucent, et al., "Introduction of 1xRTT CSfallback" 3GPP Draft; R2-086544-1XCSFALLBACK, 3rd Generation Partnership Project (3GPP), Mobile Competence Centre; 650, Route Des Lucioles; F-06921 Sophia-Antipolis Cedex; France, No. Prague, Czech Republic; Nov. 4, 2008, XP050321455 section 10.3.1 UE Capability Configuration.

(Continued)

*Primary Examiner* — George Eng
*Assistant Examiner* — Marcus Hammonds

(57) ABSTRACT

A method, an apparatus, and a computer program product for wireless communication are provided for reducing the amount of time for sending a measurement report message, such as a Pilot Strength Measurement Message (PSMM), after sending a completion message in wireless communication. A first radio access technology is monitored, and an indication is received on a second radio access technology. Before a transfer is made to the second radio access technology based on the indication, a UE receives neighbor information for the second radio access technology via the first radio access technology. Thereafter, a transfer is performed to transfer the UE from the first radio access technology to the second radio access technology.

23 Claims, 12 Drawing Sheets

(56) References Cited

FOREIGN PATENT DOCUMENTS

| WO | WO2007108641 | | 9/2007 |
|---|---|---|---|
| WO | 2009081268 | A1 | 7/2009 |
| WO | 2009117588 | A1 | 9/2009 |

OTHER PUBLICATIONS

Anonymous: "ARIB TR-T12-36.938 V8.0.0 Improved Network Controlled Mobility between E-UTRN and 3GPP2/Mobile WIMAX Radio Technologies (Release 8)", ARIB [Online] No. TR 36.938 V8.0.0, Mar. 31, 2008, pp. 1-34, XP002545496, Retrieved from the Internet: URL:http://www.ari b.or.jp/IMT-2000/V730Jul 09/3_T12/ARIB-TR-T12/Rel8/36/A3 6938-800.pdf> [retrieved on Sep. 11, 2009].

"Digital cellular telecommunications system (Phase 2+); Universal Mobile Telecommunications System (UMTS); LTE; Circuit Switched (CS) fallback in Evolved Packet System (EPS); Stage 2 (3GPP TS 23.272 version 8.4.0 Release 8 )", Technical Specification, European Telecommunications Standards Institute (ETSI), 650, Route Des Lucioles ; F-06921 Sophia-Antipolis; France, No. V8.4.0, Jun. 1, 2009, XP014044533.

International Search Report and Written Opinion—PCT/US2010/042186, International Search Authority—European Patent Office—Dec. 10, 2010.

* cited by examiner

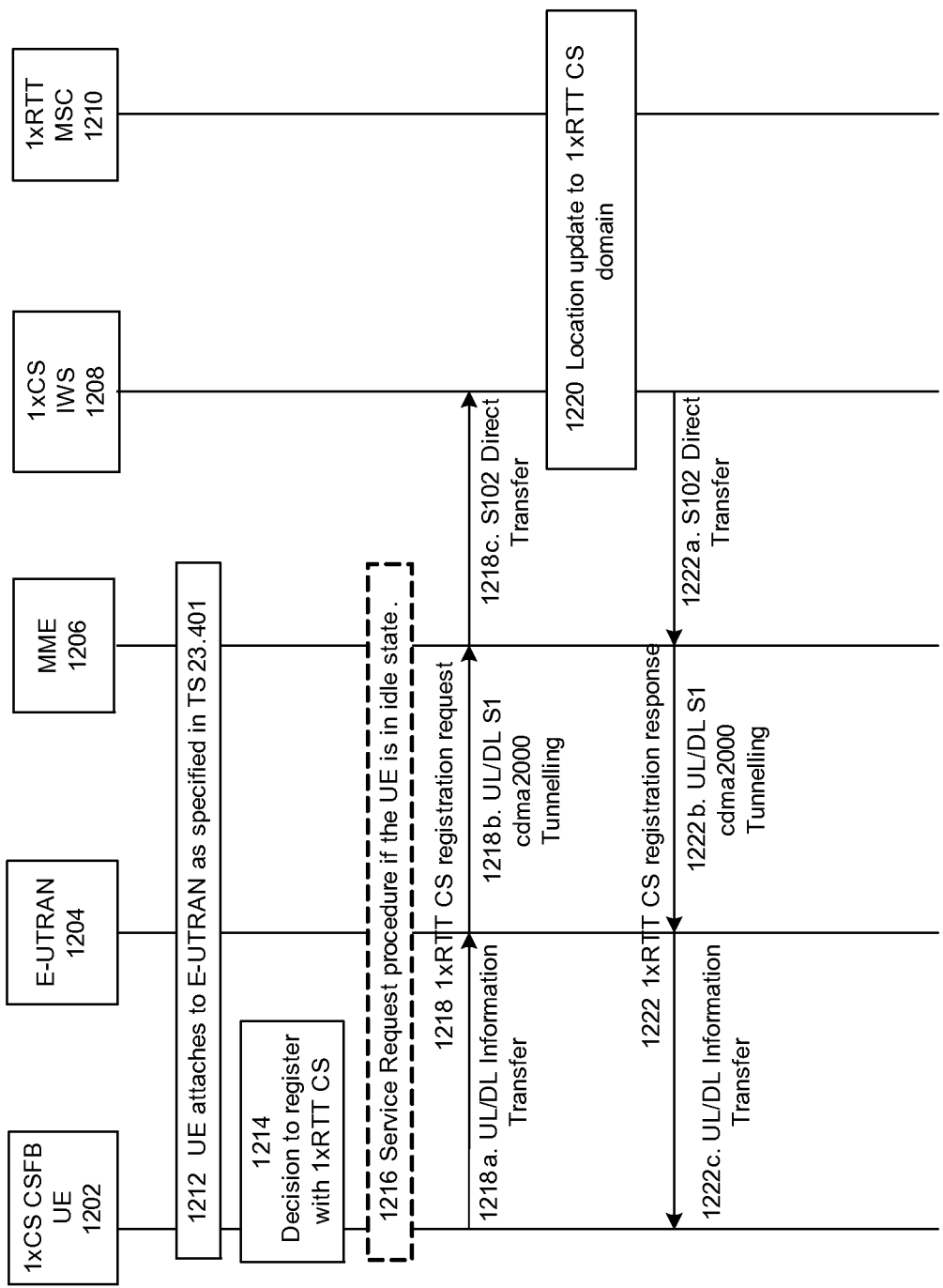

APPARATUS AND METHOD TO PERFORM FAST NEIGHBOR LIST SEARCH DURING A TRANSFER TO A DIFFERENT RAT TARGET SYSTEM

CLAIM OF PRIORITY UNDER 35 U.S.C. §119

This application claims the benefit of U.S. Provisional Application Ser. No. 61/225,630, entitled "A METHOD TO PERFORM FAST NEIGHBOR LIST SEARCH DURING A HANDOFF TO DIFFERENT RAT TARGET SYSTEM" and filed on Jul. 15, 2009, assigned to the assignee hereof, and expressly incorporated by reference herein in its entirety.

BACKGROUND

1. Field

The present disclosure relates generally to communication systems, and more particularly, to reducing the amount of time for sending a Pilot Strength Measurement Message (PSMM) after sending a completion message during a transfer between a first Radio Access Technology (RAT) and a second RAT in wireless communication.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

1x Circuit Switched Fallback (1xCSFB) provides a mechanism to support 1x circuit services while a User Equipment (UE) camps on Evolved UMTS Terrestrial Radio Access Network (E-UTRAN). In native 1x, state searches including neighbor searches are performed while a mobile device in is a 1x idle state. Therefore, a UE enters traffic with a neighbor list generated during the 1x idle state, including filtered search results. This allows a head start on the searching that the UE performs in traffic because the UE will have a starting point to prioritize what to search. The UE has a better chance of moving better neighbor pilots into an active neighbor set quickly.

However, in Enhanced 1xCSFB (e1xCSFB), the Universal Handoff Direction Message (UHDM) will direct the UE to transfer from E-UTRAN into 1x traffic without neighbors. This increases the chance of fast call drops for the UE. After a 1x neighbor list is received, the UE will require additional time to build up multiple measurements in an algorithmic fashion to determine whether to report neighbors identified on the neighbor list. These measurements must be built and made before the UE sends a PSMM and begins the process of moving a neighbor pilot into the active neighbor set. In highly dynamic environments, this added delay can cause a large number of dropped calls due to a lack of neighbors in the active set.

Therefore, a mechanism is needed for reducing the amount of fast call drops during a transfer from a first RAT to a second RAT.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects include a method for reducing the amount of time for reporting a measurement report message after sending a completion message for a transfer from a first RAT to a second RAT in wireless communication, the method including monitoring a first RAT, receiving an indication on a second RAT, prior to a transfer from the first RAT to the second RAT based on the indication, receiving neighbor information for the second RAT via the first RAT, and performing the transfer from the first RAT to the second RAT.

The method may further include, prior to the transfer, searching an environment based on the neighbor information, generating a first neighbor list of neighbors based on the neighbor information, and prior to the transfer, preparing to report the neighbors in the first neighbor list.

The method may further include receiving a second neighbor list via the second RAT after the transfer, comparing the first neighbor list to the second neighbor list, and removing neighbors from the first neighbor list that are not included in the second neighbor list.

The method may further include prior to the transfer, searching an environment based on the neighbor list, and prior to the transfer, preparing to report the neighbors in the neighbor list.

The neighbor information may be received as broadcasted information from the first RAT. The broadcasted information from which the neighbor information is received may include System Information Block 8 (SIB8) re-selection parameters. The neighbor information may include a neighbor list from the second RAT that is tunneled via the first radio access technology prior to the transfer. The neighbor list may be sent along with a handoff message. The first radio access technology may be Long Term Evolution (LTE) and the second RAT may be 1x.

The method may further include sending the measurement report message to the second RAT after a transfer completion based on the neighbor cell information, wherein the neighbor cell information is measured via the first RAT, and wherein the transfer includes an x-way soft handoff based on a fast neighbor scan of the neighbor cell information that results in a soft handoff status, wherein x comprises an integer equal to or greater than 1.

Aspects further include at least one processor configured to reduce the amount of time for sending a measurement report message after sending a completion message for a transfer from a first RAT to a second RAT in wireless communication, the processor including a first module for monitoring a first RAT, a second module for receiving an indication on a second RAT, a third module for prior to a transfer from the first RAT to the second RAT based on the indication, receiving neighbor information for the second RAT via the first RAT, and a fourth module for performing the transfer from the first RAT to the second RAT.

Aspects further include a computer program product for reducing the amount of time for sending a measurement report message after sending a completion message for a transfer from a first RAT to a second RAT in wireless communication, comprising a computer-readable medium including a first set of codes for causing a computer to monitor a first RAT, a second set of codes for causing a computer to receive an indication on a second RAT, a third set of codes for causing a computer to receive neighbor information for the second RAT via the first RAT prior to a transfer from the first RAT to the second RAT based on the indication, and a fourth set of codes for causing a computer to performing the transfer from the first RAT to the second RAT.

Aspects further include an apparatus for reducing the amount of time for sending a measurement report message after sending a completion message for a transfer from a first RAT to a second RAT in wireless communication, the apparatus including means for monitoring a first RAT, means for receiving an indication on a second RAT, means for prior to a transfer from the first RAT to the second RAT based on the indication, receiving neighbor information for the second RAT via the first RAT, and means for performing the transfer from the first RAT to the second RAT.

Aspects further include an apparatus for reducing the amount of time for sending a measurement report message after sending a completion message for a transfer from a first RAT to a second RAT in wireless communication, the apparatus including a monitoring component configured to monitor a first RAT, a receiver configured to receive an indication on a second RAT and to receive neighbor information for the second RAT via the first RAT, prior to a transfer from the first RAT to the second RAT based on the indication, and a processor configured to transfer from the first RAT to the second RAT.

The neighbor information may be received as broadcasted information from the first RAT. The broadcasted information from which the neighbor information is received may include System Information Block 8 (SIB8) re-selection parameters. The neighbor information may include a neighbor list from the second RAT that is tunneled via the first radio access technology prior to the transfer. The neighbor list may be sent along with a handoff message. The first radio access technology may be Long Term Evolution (LTE) and the second RAT may be 1x.

The processor may be further configured to search an environment based on the neighbor information, prior to the transfer, generate a first neighbor list of neighbors based on the neighbor information, and prepare to report the neighbors in the first neighbor list, prior to the transfer.

The receiver may be further configured to receive a second neighbor list via the second RAT after the transfer, and wherein the processor is further configured to compare the first neighbor list to the second neighbor list and to remove neighbors from the first neighbor list that are not included in the second neighbor list.

The processor may be further configured to search an environment based on the neighbor list, prior to the transfer; and prepare to report the neighbors in the neighbor list, prior to the transfer.

The apparatus may further include a transmitter configured to send the measurement report message to the second RAT after a transfer completion based on the neighbor cell information, wherein the neighbor cell information is measured via the first RAT, and wherein the transfer includes an x-way soft handoff based on a fast neighbor scan of the neighbor cell information that results in a soft handoff status, wherein x comprises an integer equal to or greater than 1.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 12 is a flow diagram for pre-registration.

DETAILED DESCRIPTION

Figure 1:
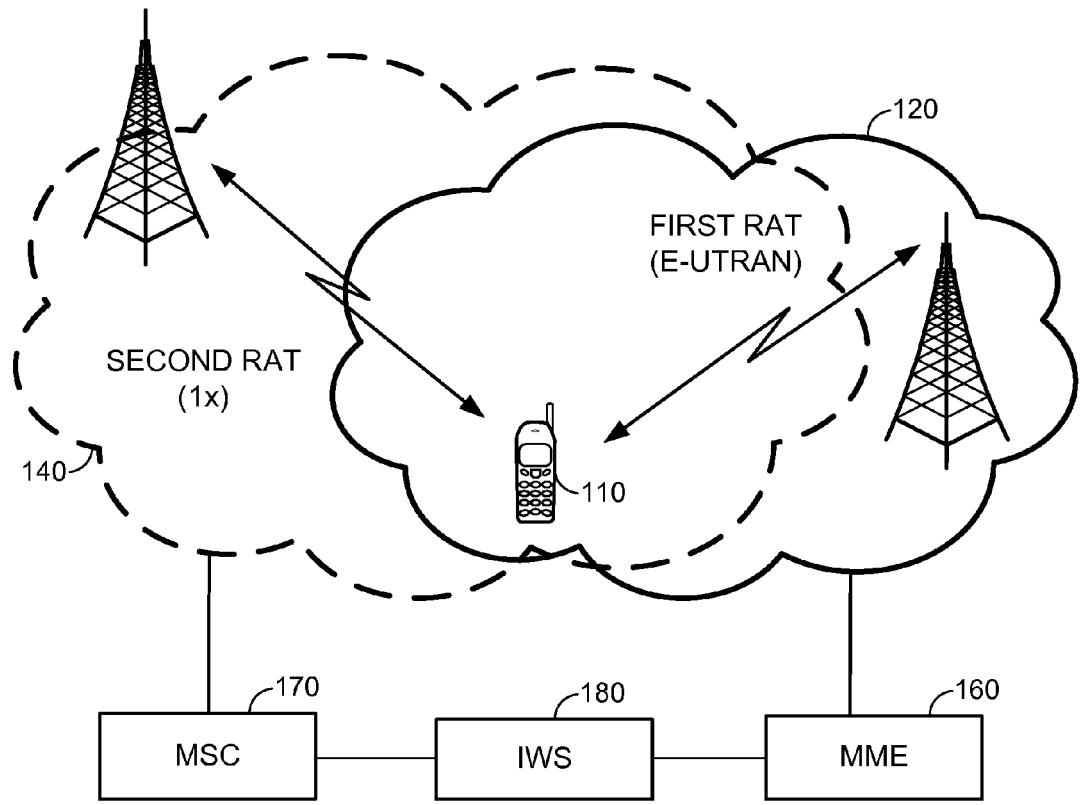
FIG. 1 is a diagram illustrating exemplary aspects of a first and second RAT.

Various aspects are now described with reference to the drawings. In the following description, for purposes of explanation, numerous specific details are set forth in order to provide a thorough understanding of one or more aspects. It may be evident, that such aspect(s) may be practiced without these specific details.

Fast call drops can be reduced by reducing the amount of time for sending a Pilot Strength Measurement Message (PSMM) after sending a completion message for a transfer from a first Radio Access Technology (RAT) to a second RAT in wireless communication. This reduction in time can be accomplished once an indication of a call on a second RAT has been received via a first RAT by receiving neighbor information for the second RAT via the first RAT prior to a transfer from the first RAT to the second RAT.

For example, in one or more aspects, the neighbor information may be received as SIB8 reselection parameters or as a tunneled neighbor list via the first RAT. The first RAT may be, for example, LTE and the second RAT may be 1x. By receiving 1x neighbor information via LTE prior to a transfer to 1x, the described apparatus and method enables a user equipment to perform an environment search based on the neighbor information, and optionally to perform the steps required to report neighbors identified in the search. These steps may include the generation of a neighbor list, and building filtering algorithms based on the environment search for determining whether to report neighbors on the neighbor list, all before a transfer to 1x occurs.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 illustrates a first RAT 120 having overlapping coverage with a second RAT 140. A UE 110 may be capable of communicating via both the first and second RAT. In an aspect, the first RAT may preserve certain resources such as power and bandwidth in a manner that is more efficient than the second RAT. Therefore, the UE 110 may remain in communication, whether in an active or idle state, with the first RAT until a need arises to communicate via the second RAT. For example, the first RAT may be LTE E-UTRAN and the second RAT may be 1x. The LTE RAT may be connected to a Mobility Management Entity (MME) 160. A 1x RAT may be connected to a Mobile Switching Center (MSC) 170. Interworking Solution (IWS) 180 may serve to link the MME 160 of the E-UTRAN 120 with the MSC 170 of 1x RAT 140.

Additional power would be required for the UE to monitor both the first RAT and the second RAT at the same time. In addition, the idle state in LTE has a reduced power usage. Therefore, the UE 110 may remain in either an active or idle state with LTE until a call is received for the UE via 1x.

In native 1x, state searches, including neighbor searches, are performed while a mobile device is in an idle state. Therefore, a UE enters traffic with a neighbor list generated during the idle state, including filtered search results. This allows a head start on the searching that the UE performs in traffic because the UE will have a starting point to prioritize what to search once the transition to an active state is made. As such, the UE has a better chance of moving desirable neighbor pilots into an active set quickly.

However, 1x neighbors are not searched and monitored via LTE. Therefore, in e1xCSFB (Circuit Switch Fall Back), when a 1x call is received, the Universal Handoff Direction Message (UHDM) will direct the UE to transfer from LTE into 1x traffic without neighbors. This increases the chance of fast call drops for the UE. After a neighbor list is received via 1x, the UE will require additional time to build up the necessary multiple measurements in an algorithmic fashion to determine whether to report neighbors identified on the neighbor list. These measurements must be built and made before the UE sends a PSMM and begins the process of moving a pilot into the active set.

In order to build an active neighbor list, a UE sends a 1x message requesting a neighbor list. The UE waits for a neighbor list to be returned. Then, the UE searches the environment based on the neighbor information. This may include, for example, performing fast neighbor scans. The UE must make measurements and combine multiple measurements in an algorithmic fashion to determine whether to report certain neighbors from the neighbor list. Once the UE determines which neighbors to report, the UE sends a measurement report message, such as a PSMM. Once a return message is received, the UE can add indicated neighbors to an active neighbor list. The UE cannot send a PSMM over 1x unless it has received an indication from 1x that the neighbor to be identified in the PSMM is an actual neighbor. Thus, currently a UE requires a number of additional steps after transferring into 1x traffic before it is truly prepared with an active neighbor list to maintain the call connection.

In highly dynamic environments, this added delay can cause a large number of dropped calls due to a lack of neighbors in the active set. Fast call drops are situations where a call is dropped or the established connection falls below a required amount soon after the call is established.

The amount of fast call drops during a transfer from a first RAT to a second RAT can be decreased by reducing the amount of time for sending a measurement report message, e.g. PSMM, after sending a completion message for the transfer. This can be accomplished by a UE receiving an indication of neighbor information for the second RAT via the first RAT prior to a transfer from the first RAT to the second RAT. Then, the UE may search the environment based on the neighbor information and can generate a neighbor list of neighbors for the second RAT. The UE may also, prior to the transfer, start the process of making measurements and performing the steps required to report the neighbors in the neighbor list. This may include building algorithms for determining whether to report neighbors on the neighbor list.

For example, in an aspect, one way to receive the neighbor information is via broadcasted information from the first RAT. This may include overhead information such as System Information Block (SIB8) re-selection parameters for the second RAT. SIB8 re-selection parameters for 1x are provided to LTE. This information can be further communicated to the UE via LTE. Although the SIB8 re-selection parameters might not provide the same information that 1x would send in a neighbor list, it provides the UE with enough information to generate a neighbor list, to begin searching the environment based on the neighbor information, and to begin combining multiple measurements in an algorithmic fashion to determine whether to report a neighbor. Once a transfer is accomplished to the second RAT, e.g. 1x, the UE may receive a second neighbor list via the second RAT. At this point, the UE may compare the generated neighbor list based on the SIB8 re-selection parameters to the neighbor list from the second RAT to validate the correct neighbors. The UE may then drop neighbors or information from the generated neighbor list that do not match the actual neighbor list it receives from the second RAT.

Further, for example, in another aspect, another way for the UE to receive neighbor list information for a second RAT via a first RAT is to receive an actual neighbor list from the second RAT tunneled to the UE via the first RAT prior to transfer. For example, a 1x neighbor list may be tunneled to a UE via LTE with a handoff message, such as a UHDM. Once the neighbor list is received by the UE, the UE can search the environment based on the neighbor list and may build algorithms for determining whether to report neighbors on the neighbor list prior to transfer from LTE to 1x.

Therefore, when the UE transfers into traffic in 1x, it does so with neighbor list information. If the UE does not receive neighbor information prior to a transfer, a considerable amount of time is required for the UE to, first, receive a neighbor list while in traffic, and second, to begin making the measurements necessary to build an active neighbor list.

By receiving neighbor information via a first RAT prior to transfer to a second RAT, the UE is able to begin the process of searching the environment and combining the necessary measurements to determine whether to report certain neighbors prior to transfer. Once a transfer occurs, and an actual neighbor list is received via the second RAT, the UE can send a measurement report message, such as a PSMM, in a reduced amount of time. Therefore, the described apparatus and method enable an active neighbor list to be prepared in a reduced amount of time, thereby reducing the chance of fast call drops.

Figure 2:
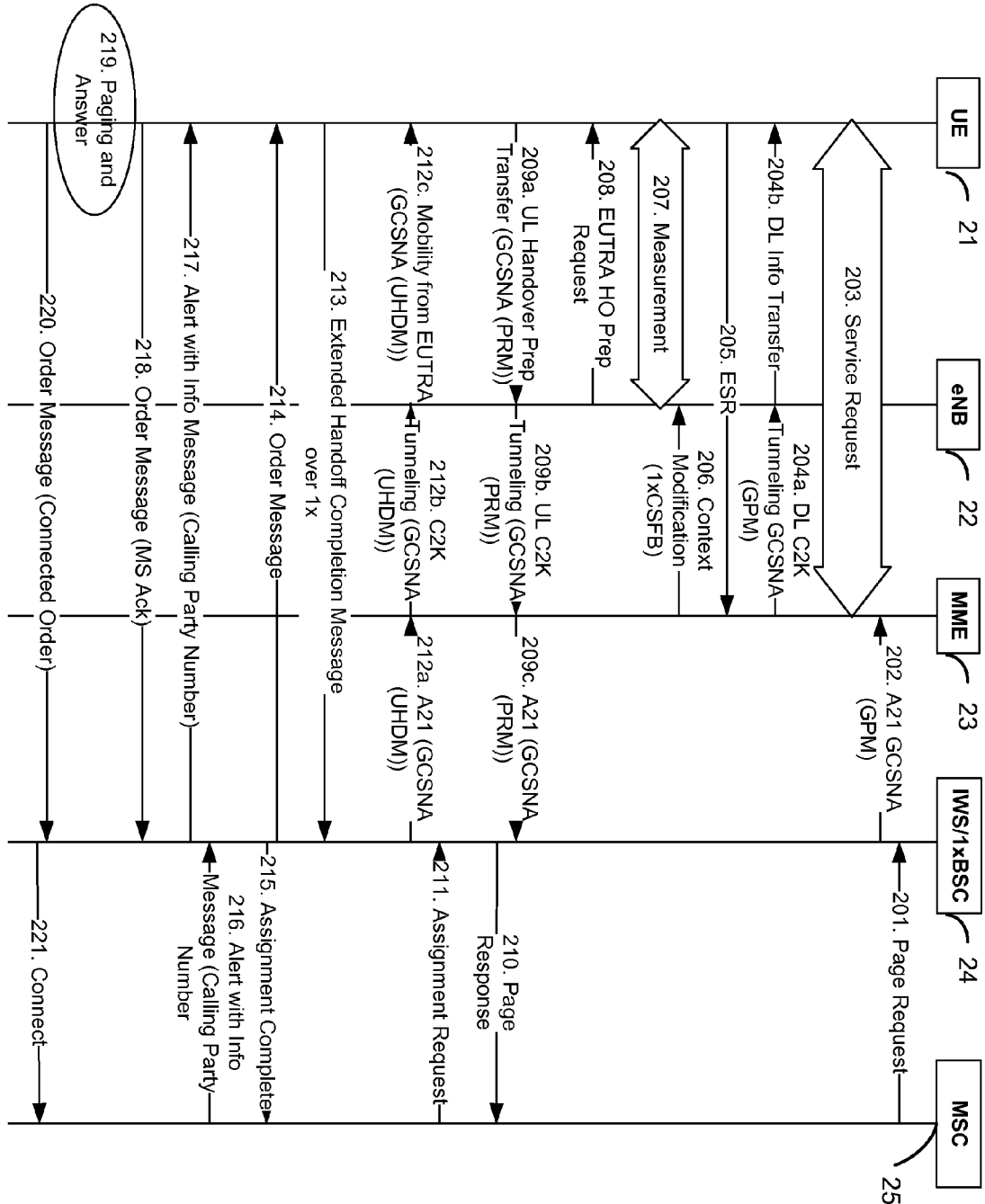
FIG. 2 is a flow diagram for a transfer from a first RAT to a second RAT.

FIG. 2 is a flow chart illustrating aspects of a transfer from a first RAT to a second RAT. In FIG. 2, the first RAT is LTE and the second RAT is 1x. A UE 21, evolved Node B (eNB) 22, MME 23, IWS 1x Base Station Controller (1xBSC) 24, MSC 25, are involved in the multi-RAT system. At 201, a page request is communicated from the MSC 25 to the IWS/1xBSC indicating an incoming call for UE 21. The general page message is encapsulated in Generic Circuit Services Notification Application (GCSNA) and communicated from the IWS 1xBSC 24 to the MME 23 at 202. Then, at 203, a service request is sent to the UE from the MME 23. At 204, the page from the first RAT (e.g. 1x) is tunneled to the UE via the second RAT (e.g. LTE). This step is shown as steps 204a and 204b. At 205, an Extended Service Request (ESR) is sent from the UE to the MME. At 206, a context modification (e.g. 1xCSFB) is communicated from the MME to the eNB communicating with the UE. This initiates a change from LTE to 1x. At 207, 1x measurements are taken at the direction of the network and are communicated between the UE and the eNB. At 208, an E-UTRA Handoff Preparation Request is sent from the eNB to the UE. In 209, Handoff Preparation Transfer information is sent from the UE to the eNB, 209a, from the eNB to the MME, 209b, and from the MME to the IWS/1xBSC, 209c. A page response is then communicated from the IWS/1xBSC to the MSC at 210. In response, the MSC 25 transmits an assignment request to the IWS/1xBSC at 211. In 212, a universal handoff message is tunneled to the UE via the first RAT. The handoff message is communicated from the IWS to the MME, 212a, from the MME to the eNB 212b, and from the eNB to the UE 212c. At 213, the UE sends an extended handoff completion message via the second RAT, e.g. via 1x, directly to the IWS/1xBSC. This indicates that the transfer to the second RAT is complete. At 214, the IWS transmits an order message. At 215, the IWS indicates to the MSC that the assignment is complete. At 216, the MSC transmits an alert with information message indicating, for example, a calling party's number. At 217, the alert information from the MSC is communicated from the 1xBSC directly to the UE via 1x. At 218, the UE sends an acknowledgement to the IWS, and at 219, the UE begins to ring indicating the presence of the call to a user. Once the user answers the call, a connected order message is sent from the UE to the IWS at 220 and a connection is established to the MSC at 221. At step 221, the call is active, or in-traffic. The UE does not transition from LTE to 1x with a neighbor list. Instead, the UE must begin to gather information and make measurements in order to generate a neighbor list while in traffic.

Figure 3:
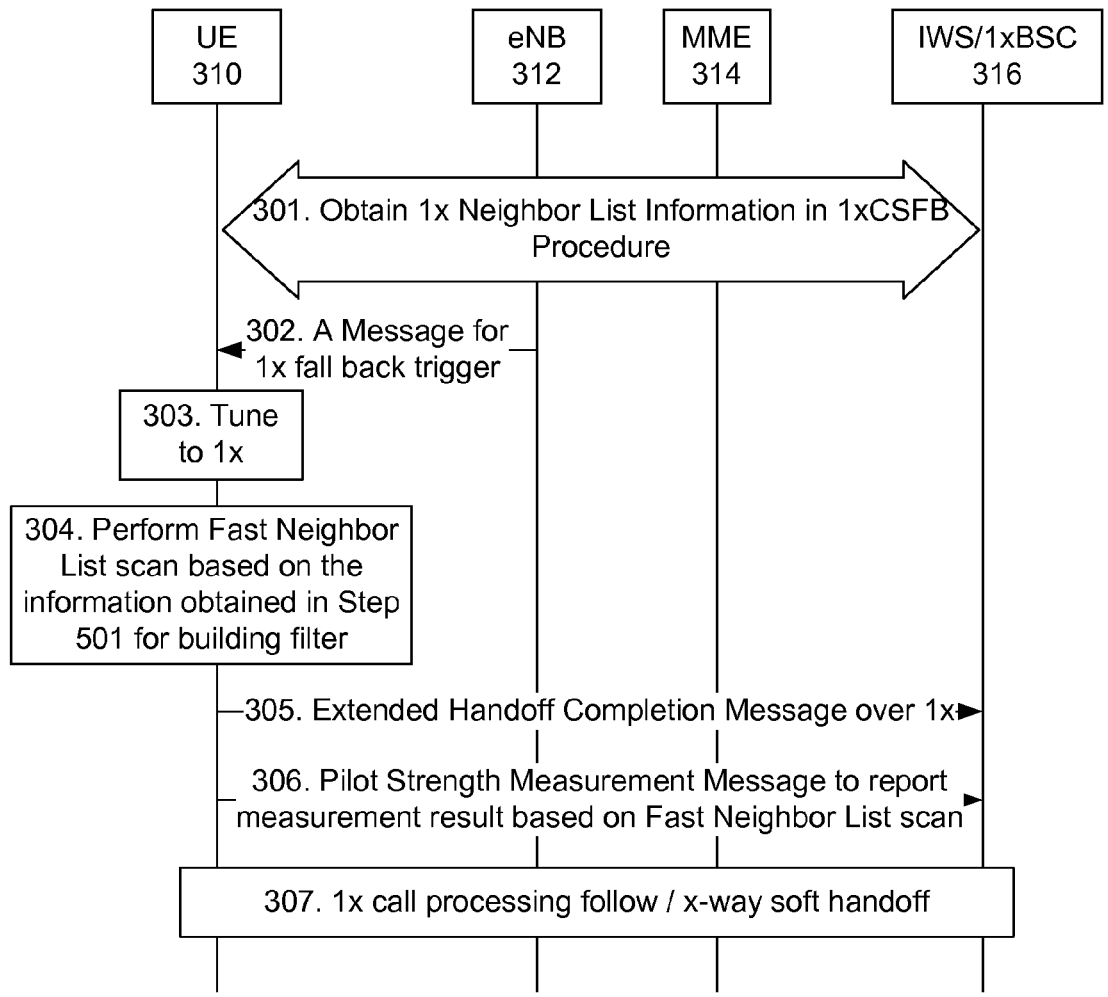
FIG. 3 is a flow diagram for receiving neighbor list information prior to a transfer from a first RAT to a second RAT.

FIG. 3 illustrates a flow chart for obtaining neighbor list information via a first RAT prior to performing a transfer from the first RAT to answer a call on a second RAT. This reduces the amount of time for sending a PSMM after sending a completion message and reduces the amount of fast drop on calls on the second RAT.

At 301, neighbor list information is received for the second RAT 316, e.g. 1x, via the first RAT, e.g. LTE MME 514 and eNB 312. This may occur, for example, with 204 from FIG. 2. For example, in 301, a 1x neighbor list is obtained. This neighbor list information may be received as SIB8 re-selection parameters or may be a 1x neighbor list that is tunneled via the LTE network from the IWS 316. At 302, a message for 1x fall back is triggered from eNB 312 to UE 310. At 303, the UE 310 tunes to the 1x network. At 304, the UE searches the environment based on the neighbor information obtained in step 301 in order to perform the steps required to report the neighbors in the neighbor list. These steps may include combining multiple measurements in an algorithmic fashion to filter the neighbors and to determine whether to report the neighbors. At 305 an extended handoff completion message is sent directly to the 1x network, notifying the second RAT of the transfer completion. A completion message is sent, for example, at 213 in FIG. 2. Therefore, the UE has already received information regarding neighbors and has been able to perform environment scans and to perform the steps required to report the neighbors in the neighbor list. As noted above, these steps may include building the measurements and algorithms necessary to identify potential neighbors before the completion message. At 306, a pilot strength measurement message is sent from the UE to the IWS to report measurement results based on the search/scan of the environment. At 307, the 1x call processing follows. 307 may include an x-way soft handoff based on the PSMM at 306.

Figure 4:
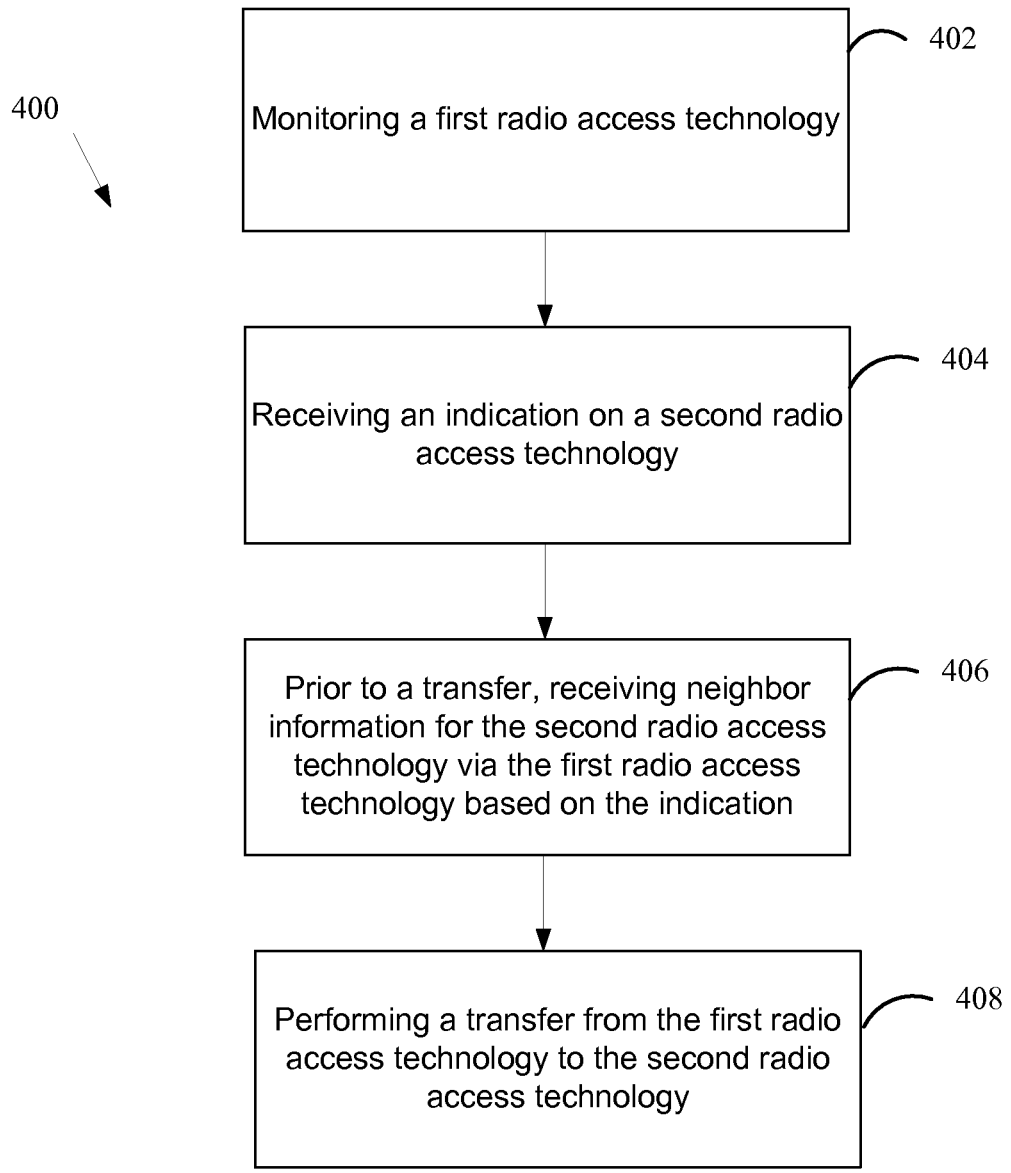
FIG. 4 is a flow chart of a method of wireless communication.

FIG. 4 is a flow chart 400 of a method for reducing the amount of time for sending a measurement report message after sending a completion message for a transfer from a first RAT to a second RAT in wireless communication. The measurement report message may be, for example, a PSMM. The method includes monitoring the first RAT 402 and receiving an indication on the second RAT 404. The indication may be, for example, an incoming call, data message, or other application directed to the UE from the second RAT. In addition, the method includes receiving neighbor information for the second RAT via the first RAT prior to a transfer from the first RAT to the second RAT based on the indication 406. Thereafter, the method includes performing a transfer from the first RAT to the second RAT based on the indication 408. Thereafter, the call, data, or other application may be received via the second RAT.

The method may further include, prior to the transfer, performing an environment search based on the neighbor information, generating a first neighbor list of neighbors based on the neighbor information; and prior to the transfer, preparing to report the neighbors on the neighbor list. Preparing to report the neighbors on the neighbor list may include performing measurements and analyzing such measurements in an algorithmic manner in order to identify which neighbors from the neighbor list to report.

The neighbor information may be received as broadcasted information from the first RAT. The broadcasted information from which the neighbor information is received may include SIB8 re-selection parameters. If the neighbor information is received as SIB8 re-selection parameters, the method may further include receiving an second neighbor list via the second RAT after the transfer, comparing the first neighbor list to the second neighbor list, and dropping neighbors from the first neighbor list that are not included in the second neighbor list.

The neighbor information may include a neighbor list from the second RAT that is tunneled via the first RAT prior to the transfer. This neighbor list may be sent along with a handoff message, such as a UHDM. If a neighbor list is tunneled via the first RAT, the method may further include prior to the transfer, performing an environment search scans based on the neighbor list and prior to the transfer, performing the steps required to report the neighbors in the first neighbor list. This may include analyzing multiple measurements in order to identify potential neighbors and to determine whether to report neighbors on the neighbor list.

The first RAT may be, for example, Long Term Evolution (LTE) and the second RAT may be, for example, 1x.

Aspects may include sending a measurement report message to the second RAT, after the transfer completion, based on the neighbor cell information measured via the first RAT. This may result in a soft handoff status, wherein the handoff includes an x-way soft handoff based on a fast neighbor scan of the neighbor information.

Figure 5:
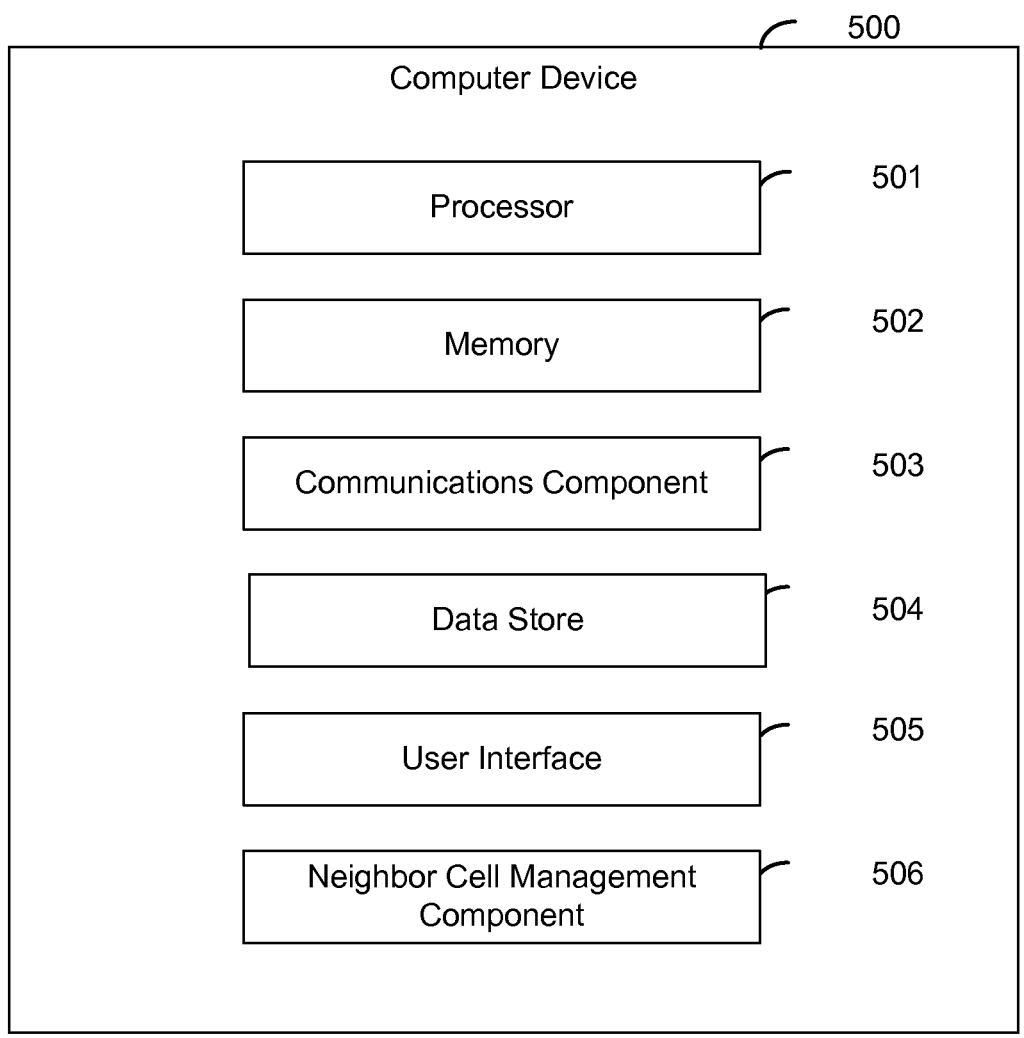
FIG. 5 is a diagram of aspects of a computer device for wireless communication.

Thus, the transfer may include an x-way soft handoff based on an environment scan based on the neighbor information, x being an integer greater than or equal to 1, e.g. 1-way, 2-way, 3-way, etc. Thus, a UE can perform an environment search based on the neighbor information, prior to receiving a neighbor list message from via the second RAT Referring to FIG. 5, in one aspect, any of devices 110, 21, 310, 702, and 806 may be represented by computer device 500. Computer device 500 includes a processor 501 for carrying out processing functions associated with one or more of components and functions described herein. Processor 501 can include a single or multiple set of processors or multi-core processors. Moreover, processor 501 can be implemented as an integrated processing system and/or a distributed processing system.

Computer device 500 further includes a memory 502, such as for storing local versions of applications being executed by processor 501. Memory 502 can include ay type of memory usable by a computer, such as random access memory (RAM), read only memory (ROM), tapes, magnetic discs, optical discs, volatile memory, non-volatile memory, and any combination thereof.

Further, computer device 500 includes a communications component 503 that provides for establishing and maintaining communications with one or more parties utilizing hardware, software, and services as described herein. Communications component 503 may carry communications between components on computer device 500, as well as between computer device 500 and external devices, such as devices located across a communications network and/or devices serially or locally connected to computer device 500. For example, communications component 503 may include one or more buses, and may further include transmit chain components and receive chain components associated with a transmitter and receiver, respectively, operable for interfacing with external devices. Communications component 503 may be capable of communicating via multiple RATs, for example via LTE and 1x.

Additionally, computer device 500 may further include a data store 504, which can be any suitable combination of hardware and/or software, that provides for mass storage of information, databases, and programs employed in connection with aspects described herein. For example, data store 504 may be a data repository for applications not currently being executed by processor 501.

Computer device 500 may additionally include a user interface component 505 operable to receive inputs from a user of computer device 500, and further operable to generate outputs for presentation to the user. User interface component 505 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 705 may include one or more output devices, including but not limited to a display, a speaker, a haptic feedback mechanism, a printer, any other mechanism capable of presenting an output to a user, or any combination thereof.

Computer device 500 may further include a neighbor list management component 506. As noted above, the computer device may be capable of communicating via multiple RATs. While the computer device is monitoring a first RAT, it may receive an indication of an incoming call via a second RAT. Prior to a transfer to the second RAT, the neighbor list management component receives neighbor information for the second RAT. The neighbor list management component uses this neighbor list information to perform an environment search based on the neighbor information and to perform the steps required to report the identified neighbors. The neighbor information may be received as SIB8 re-selection parameters or as a neighbor list tunneled from the second RAT via the first RAT. The neighbor information may also include information based on measurements made via the first RAT. The first RAT may be LTE, and the second RAT may be 1x. The tunneled neighbor information may be sent along with a UHDM.

Figure 6:
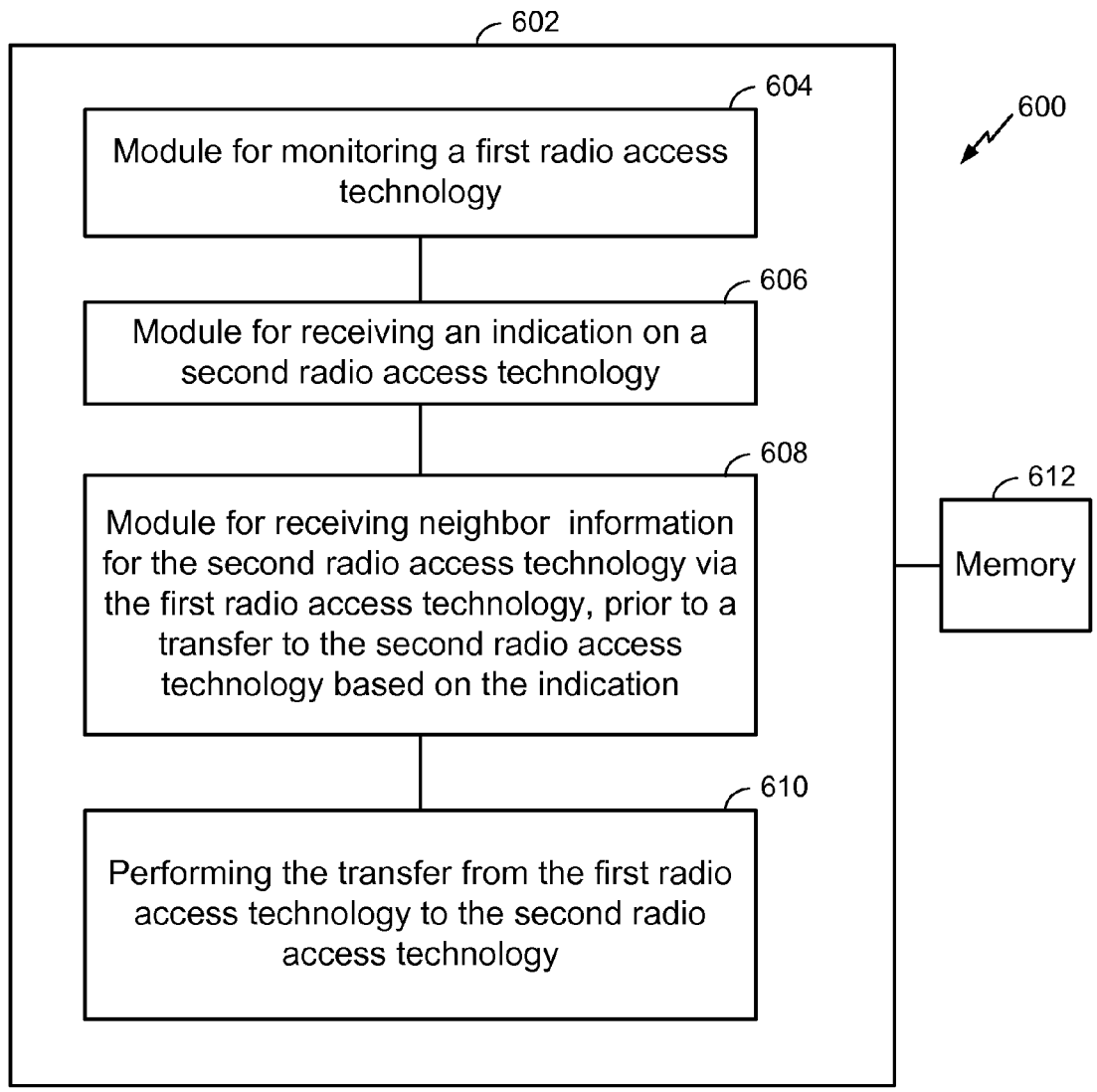
FIG. 6 is a conceptual block diagram illustrating the functionality of an exemplary apparatus.

With reference to FIG. 6, illustrated is a system 600 that reduces the amount of time for sending a measurement report message, such as a PSMM, after sending a completion message for a transfer from a first RAT to a second RAT in wireless communication. For example, system 600 can reside at least partially within a computer device, mobile device, etc. It is to be appreciated that system 600 is represented as including functional blocks, which can be functional blocks that represent functions implemented by a processor, software, or combination thereof (e.g., firmware). System 600 includes a logical grouping 602 of electrical components that can act in conjunction. For instance, logical grouping 602 can include a module for monitoring a first RAT 604. The first access system may be, for example LTE.

Further, logical grouping 602 can comprise a module for receiving an indication on a second RAT 606. The second radio access technology may be, for example, 1x. The indication may be, for example, an incoming call, data message, or other application directed to the UE from the second RAT.

Furthermore, logical grouping 602 can comprise a module for receiving neighbor information for the second RAT via the first RAT, prior to a transfer from the first radio access technology to the second RAT based on the indication 608.

Logical grouping 602 may further comprise a module for performing the transfer from the first RAT to the second RAT 610. Thereafter, the call, data, or other application may be received via the second RAT.

Figure 7:
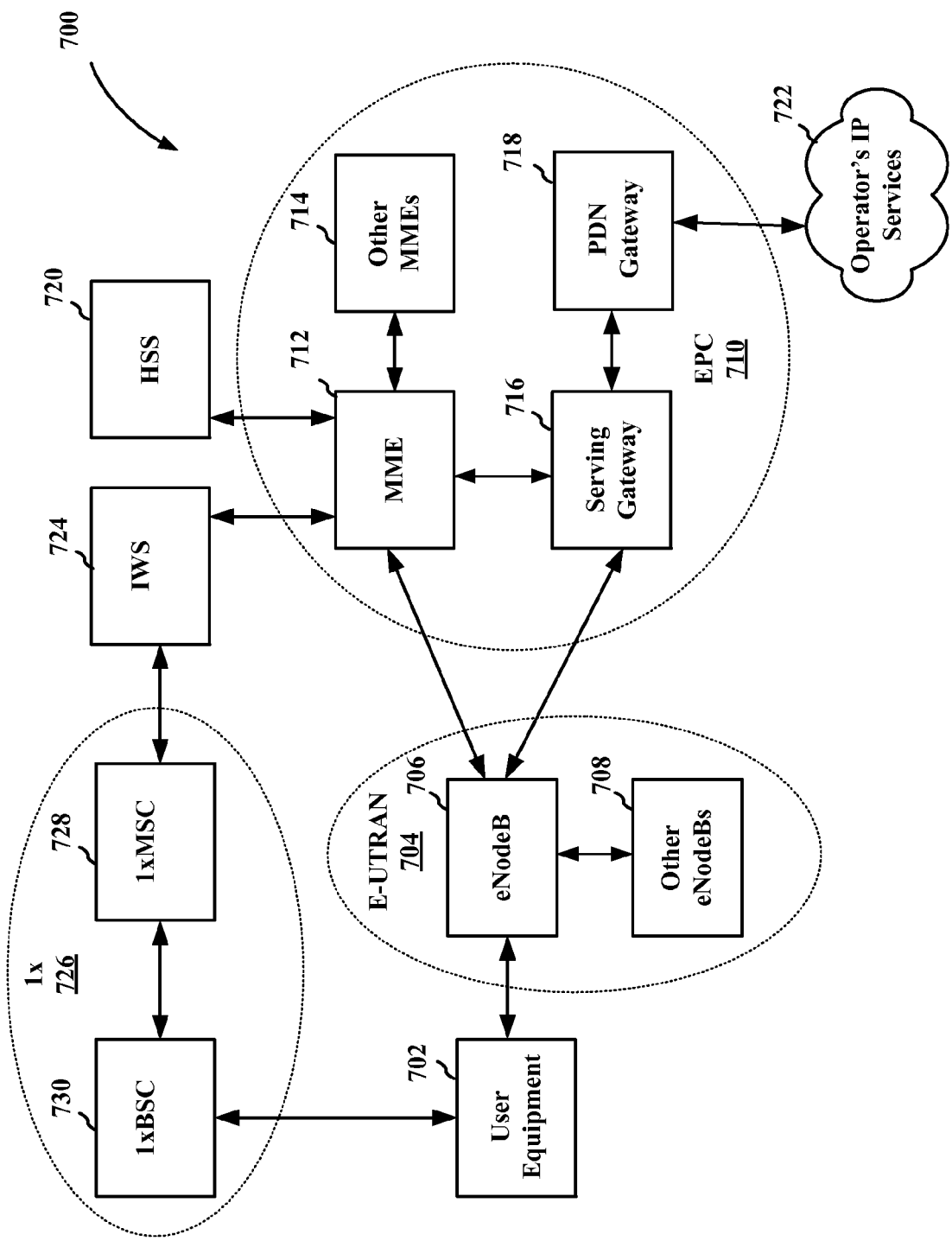
FIG. 7 is a diagram illustrating exemplary network architecture.

FIG. 7 is a diagram illustrating an overlapping LTE and 1x network architecture 700 employing various apparatuses. The LTE network architecture 800 may be referred to as an Evolved Packet System (EPS) 700. The EPS 700 may include one or more user equipment (UE) 702, an E-UTRAN 704, an Evolved Packet Core (EPC) 710, a Home Subscriber Server (HSS) 720, and an Operator's IP Services 722. The EPS can interconnect with other access networks, but for simplicity those entities/interfaces are not shown.

The E-UTRAN includes the eNB 706 and other eNBs 708. The eNB 706 provides user and control plane protocol terminations toward the UE 702. The eNB 706 may be connected to the other eNBs 708 via an X2 interface (i.e., backhaul). The eNB 706 may also be referred to by those skilled in the art as a base station, a base transceiver station, a radio base station, a radio transceiver, a transceiver function, a basic service set (BSS), an extended service set (ESS), or some other suitable terminology. The eNB 706 provides an access point to the EPC 710 for a UE 702. Examples of UEs 702 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 702 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 706 is connected by an S1 interface to the EPC 710. The EPC 710 includes a MME 712, other MMEs 714, a Serving Gateway 716, and a Packet Data Network (PDN) Gateway 718. The MME 712 is the control node that processes the signaling between the UE 702 and the EPC 710. Generally, the MME 712 provides bearer and connection management. All user IP packets are transferred through the Serving Gateway 716, which itself is connected to the PDN Gateway 718. The PDN Gateway 718 provides UE IP address allocation as well as other functions. The PDN Gateway 718 is connected to the Operator's IP Services 722. The Operator's IP Services 722 include the Internet, the Intranet, an IP Multimedia Subsystem (IMS), and a PS Streaming Service (PSS).

The 1x network 726 includes 1xMSC 728 and 1xBSC 730. 1xMSC 730 provides an access point for UE 702 to the 1x network 726. IWS 724 provides a link between the E-UTRAN 704 and the 1x network 726.

Figure 8:
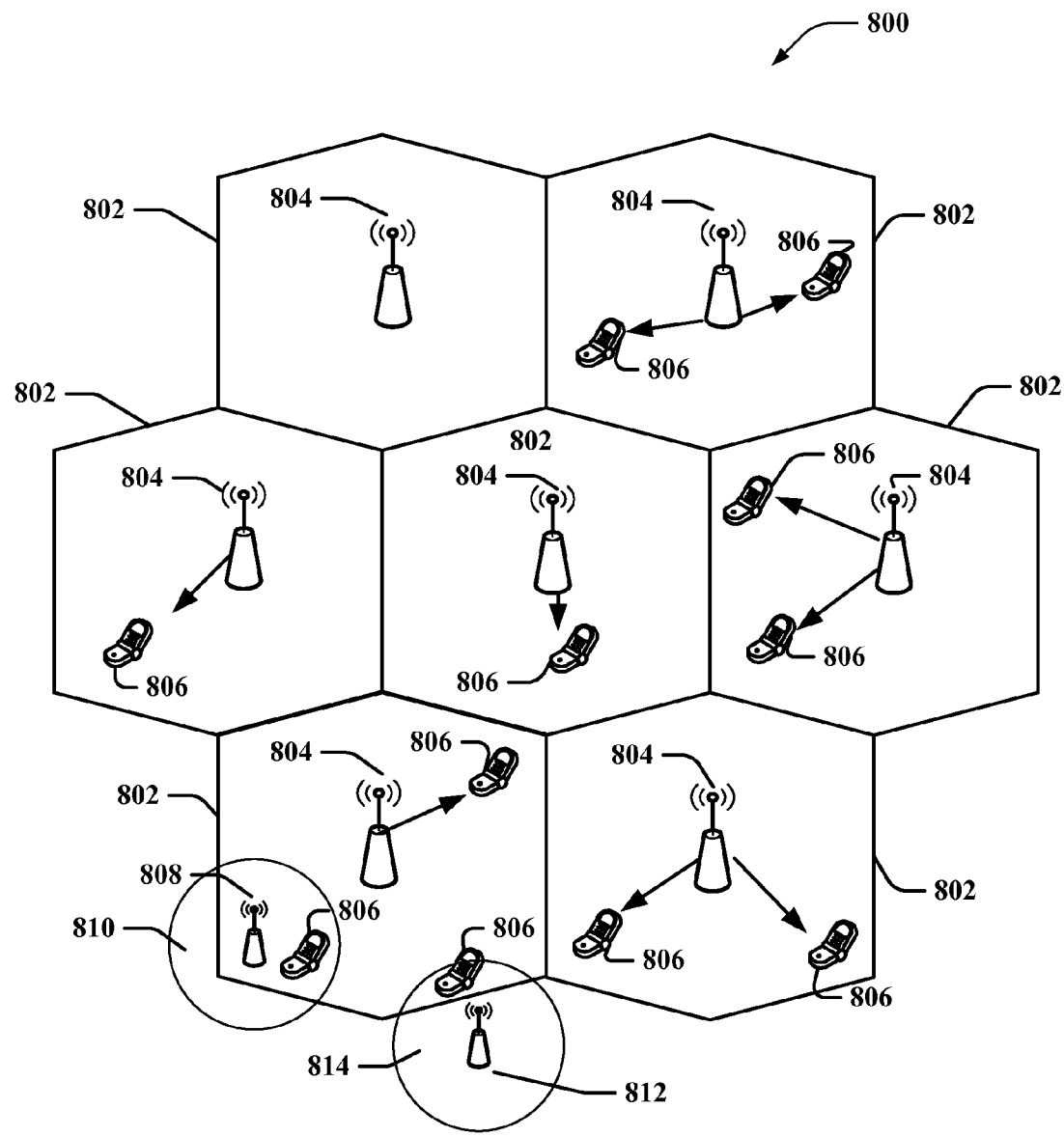
FIG. 8 is a diagram illustrating an example of an access network.

FIG. 8 is a diagram illustrating an example of an access network in an LTE network architecture. In this example, the access network 800 is divided into a number of cellular regions (cells) 802. One or more lower power class eNBs 808, 812 may have cellular regions 810, 814, respectively, that overlap with one or more of the cells 802. The lower power class eNBs 808, 812 may be femto cells (e.g., home eNBs (HeNBs)), pico cells, or micro cells. A higher power class or macro eNB 804 is assigned to a cell 802 and is configured to provide an access point to the EPC 810 for all the UEs 806 in the cell 802. There is no centralized controller in this example of an access network 800, but a centralized controller may be used in alternative configurations. The eNB 804 is responsible for all radio related functions including radio bearer control, admission control, mobility control, scheduling, security, and connectivity to the serving gateway 716 (see FIG. 7).

The modulation and multiple access scheme employed by the access network 800 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNB 804 may have multiple antennas supporting MIMO technology. The use of MIMO technology enables the eNB 804 to exploit the spatial domain to support spatial multiplexing, beamforming, and transmit diversity.

Figure 9:
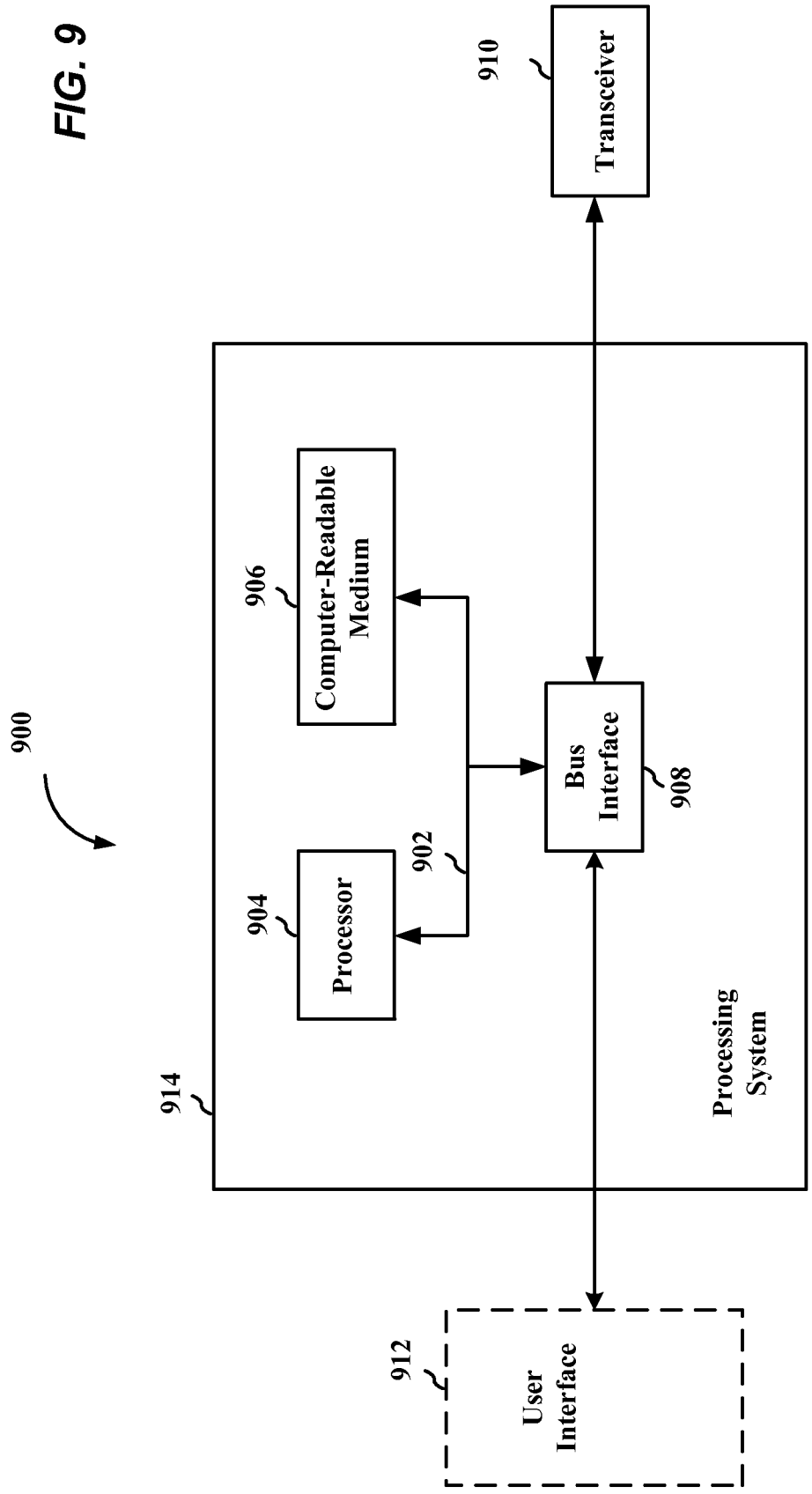
FIG. 9 is a diagram illustrating an example of a hardware implementation for an apparatus employing a processing system.

FIG. 9 is a conceptual diagram illustrating an example of a hardware implementation for an apparatus 900 employing a processing system 914. In this example, the processing system 914 may be implemented with a bus architecture, represented generally by the bus 902. The bus 902 may include any number of interconnecting buses and bridges depending on the specific application of the processing system 914 and the overall design constraints. The bus 902 links together various circuits including one or more processors, represented generally by the processor 904, and computer-readable media, represented generally by the computer-readable medium 906. The bus 902 may also link various other circuits such as timing sources, peripherals, voltage regulators, and power management circuits, which are well known in the art, and therefore, will not be described any further. A bus interface 908 provides an interface between the bus 902 and a transceiver 910. The transceiver 910 provides a means for communicating with various other apparatus over a transmission medium. Depending upon the nature of the apparatus, a user interface 912 (e.g., keypad, display, speaker, microphone, joystick) may also be provided.

The processor 904 is responsible for managing the bus 902 and general processing, including the execution of software stored on the computer-readable medium 906. The software, when executed by the processor 904, causes the processing system 914 to perform the various functions described infra for any particular apparatus. The computer-readable medium 906 may also be used for storing data that is manipulated by the processor 904 when executing software.

Figure 10:
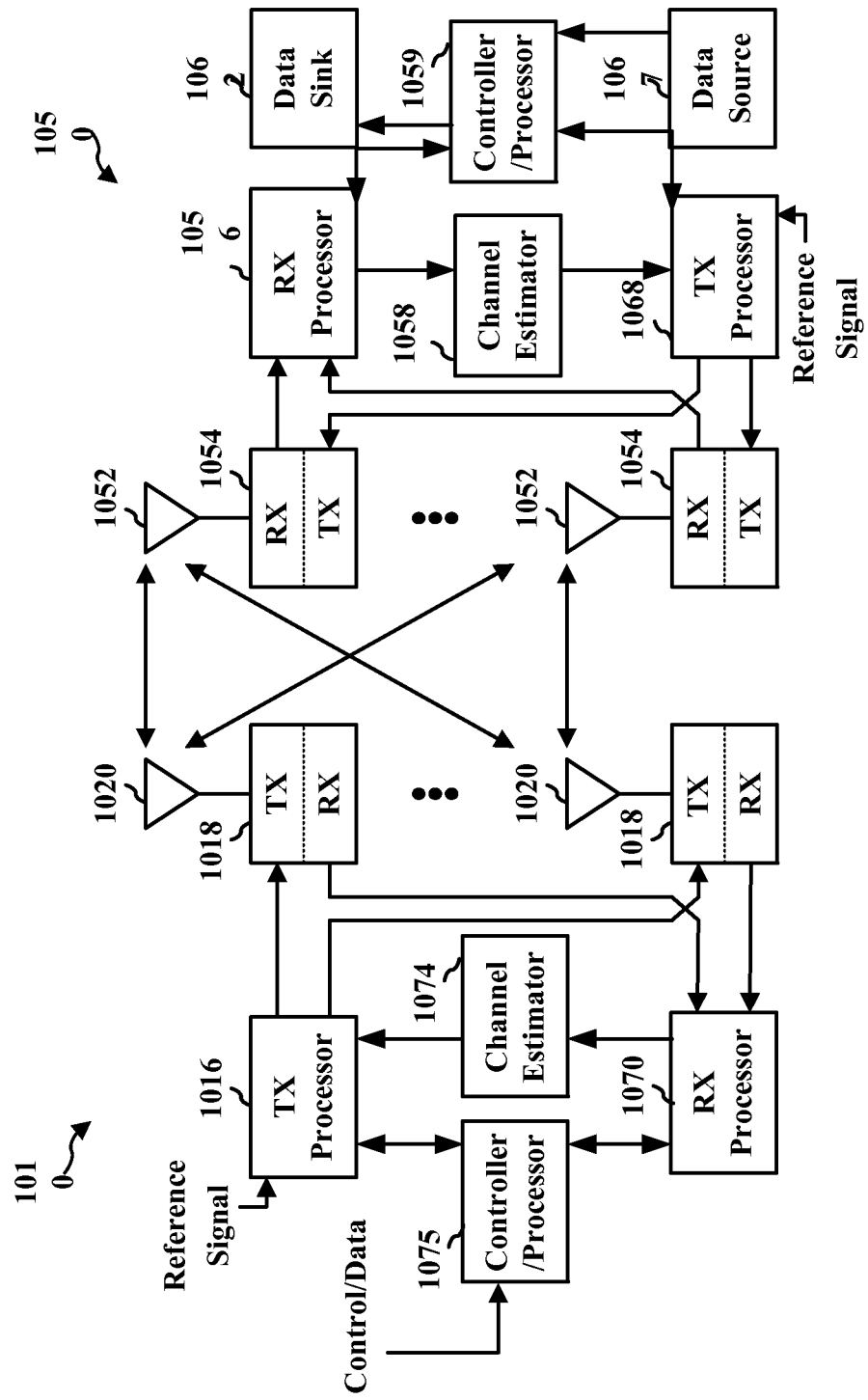
FIG. 10 is a diagram illustrating an example of an evolved Node B and user equipment in an access network.

FIG. 10 is a block diagram of an eNB 1010 in communication with a UE 1050 in an access network. In the DL, upper layer packets from the core network are provided to a controller/processor 1075. The controller/processor 1075 implements the functionality of the L2 layer. In the DL, the controller/processor 1075 provides header compression, ciphering, packet segmentation and reordering, multiplexing between logical and transport channels, and radio resource allocations to the UE 1050 based on various priority metrics. The controller/processor 1075 is also responsible for HARQ operations, retransmission of lost packets, and signaling to the UE 1050.

The TX processor 1016 implements various signal processing functions for the L1 layer (i.e., physical layer). The signal processing functions includes coding and interleaving to facilitate forward error correction (FEC) at the UE 1050 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 1074 may be used to determine the coding and modulation scheme, as well as for spatial processing. The channel estimate may be derived from a reference signal and/or channel condition feedback transmitted by the UE 1050. Each spatial stream is then provided to a different antenna 1020 via a separate transmitter 1018TX. Each transmitter 1018TX modulates an RF carrier with a respective spatial stream for transmission.

At the UE 1050, each receiver 1054RX receives a signal through its respective antenna 1052. Each receiver 1054RX recovers information modulated onto an RF carrier and provides the information to the receiver (RX) processor 1056.

The RX processor 1056 implements various signal processing functions of the L1 layer. The RX processor 1056 performs spatial processing on the information to recover any spatial streams destined for the UE 1050. If multiple spatial streams are destined for the UE 1050, they may be combined by the RX processor 1056 into a single OFDM symbol stream. The RX processor 1056 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 1010. These soft decisions may be based on channel estimates computed by the channel estimator 1058. The soft decisions are then decoded and deinterleaved to recover the data and control signals that were originally transmitted by the eNB 1010 on the physical channel. The data and control signals are then provided to the controller/processor 1059.

The controller/processor 1059 implements the L2 layer. In the UL, the control/processor 1059 provides demultiplexing between transport and logical channels, packet reassembly, deciphering, header decompression, control signal processing to recover upper layer packets from the core network. The upper layer packets are then provided to a data sink 1062, which represents all the protocol layers above the L2 layer. Various control signals may also be provided to the data sink 1062 for L3 processing. The controller/processor 1059 is also responsible for error detection using an acknowledgement (ACK) and/or negative acknowledgement (NACK) protocol to support HARQ operations.

In the UL, a data source 1067 is used to provide upper layer packets to the controller/processor 1059. The data source 1067 represents all protocol layers above the L2 layer (L2). Similar to the functionality described in connection with the DL transmission by the eNB 1010, the controller/processor 1059 implements the L2 layer for the user plane and the control plane by providing header compression, ciphering, packet segmentation and reordering, and multiplexing between logical and transport channels based on radio resource allocations by the eNB 1010. The controller/processor 1059 is also responsible for HARQ operations, retransmission of lost packets, and signaling to the eNB 1010.

Channel estimates derived by a channel estimator 1058 from a reference signal or feedback transmitted by the eNB 1010 may be used by the TX processor 1068 to select the appropriate coding and modulation schemes, and to facilitate spatial processing. The spatial streams generated by the TX processor 1068 are provided to different antenna 1052 via separate transmitters 1054TX. Each transmitter 1054TX modulates an RF carrier with a respective spatial stream for transmission.

The UL transmission is processed at the eNB 1010 in a manner similar to that described in connection with the receiver function at the UE 1050. Each receiver 1018RX receives a signal through its respective antenna 1020. Each receiver 1018RX recovers information modulated onto an RF carrier and provides the information to a RX processor 1070. The RX processor 1070 implements the L1 layer.

The controller/processor 1059 implements the L2 layer. In the UL, the control/processor 1059 provides demultiplexing between transport and logical channels, packet reassembly, deciphering, header decompression, control signal processing to recover upper layer packets from the UE 1050. Upper layer packets from the controller/processor 1075 may be provided to the core network. The controller/processor 1059 is also responsible for error detection using an ACK and/or NACK protocol to support HARQ operations.

The processing system 914 described in relation to FIG. 9 may be included in the UE 1050. In particular, the processing system 914 may include the TX processor 1068, the RX processor 1056, and the controller/processor 1059.

The aforementioned modules may include the processing system 914 configured to perform the aforementioned functions recited. As described supra, the processing system 914 includes the TX Processor 1068, the RX Processor 1056, and the controller/processor 1059. As such, in one configuration, the aforementioned modules may include the TX Processor 1068, the RX Processor 1056, and the controller/processor 1059 configured to perform the aforementioned functions.

Figure 11:
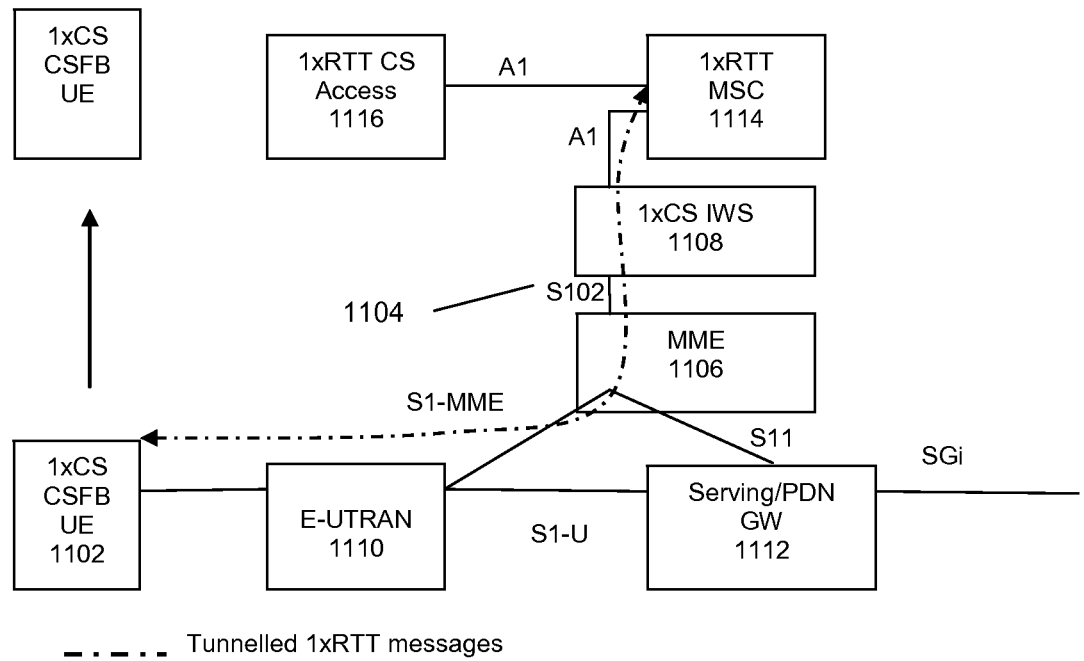
FIG. 11 is a flow diagram for a CS Fallback to 1xRTT.

FIG. 11 illustrates aspects of an exemplary CS Fallback to a 1xRTT solution for dual mode 1x Round Trip Time (1xRTT)/E-UTRAN terminals. Additional aspects are described in 3GPP TS23.272, the entire contents of which are incorporated herein by reference. The CS fallback for 1xRTT in Evolved Packet System (EPS) enables the delivery of CS-domain services (e.g. CS Voice, SMS) by reuse of the 1xCS infrastructure when a UE is served by E-UTRAN. A CS fallback enabled terminal, while connected to E-UTRAN may register in the 1x RTT CS domain in order to be able to use 1xRTT access to establish one or more CS services in the CS domain. This function is available where E-UTRAN coverage overlaps with 1xRTT coverage.

CS Fallback to 1xRTT and IMS-based services is able to co-exist in the same operator's network. CS Fallback to 1xRTT with PS Handover procedure to HRPD access for optimized HO, non-optimized HO, and Optimized Idle Mode mobility is able to co-exist in the same operator's network. The CS fallback in EPS function is enabled for a UE 1102 by reusing the S102 1704 reference point between an MME 1106 and the 1xCS IWS 1108 as illustrated in FIG. 11. S102 1104 provides a tunnel between MME and 3GPP2 1xCS IWS to relay 3GPP2 1xCS signaling messages. A 1xCS signaling message is encapsulated in the GCSNA message as defined in 3GPP2 C.S0097-0 and further encapsulated in A21-1x Air Interface Signaling message as defined in A.S0008-C or 3GPP2 A.S0009-C. 1xCS signaling messages may include those messages that are defined in 3GPP2 C.S0005-E. The reference architecture may be similar to the SRVCC architecture for E-UTRAN to 3GPP2 1xCS described in TS 23.216 with an additional aspect that the S102 session is long-lived. This may be similar to pre-registration for S101. Reference architecture for a PS handover procedure between E-UTRAN and HRPD access is defined in TS 23.402.

A UE 1102 capable of CS Fallback to 1xRTT supports access to E-UTRAN/EPC 1110 as well as to the 1xCS domain over 1xRTT 1116. The UE may further include additional functions such as 1xRTT CS registration over the EPS after the UE has completed the E-UTRAN attachment, 1xRTT CS re-registration due to mobility, CS Fallback procedures specified for 1xRTT CS domain voice service, procedures for mobile originated and mobile terminated SMS over E-UTRAN, concurrent 1xRTT and HPRD capability indication as part of the UE radio capabilities, and enhanced CS fallback to 1xRTT capability indication as part of the UE radio capabilities.

The MME 1106 enabled for CS Fallback to 1xRTT may serve as a tunneling end point towards the 3GPP2 1xCS IWS via S102 interface for sending/receiving encapsulated 3GPP2 1xCS signaling messages to/from the UE, which may be encapsulated in S1-MME S1 CDMA2000 TunnelingMessages, as defined, for example, in TR 36. 413. The MME 1106 may support additional functions, such as, 1xCS-IWS selection for CSFB procedures, handling of S102 tunnel redirection in case of MME relocation, and buffering messages received via S102 for UEs in an idle state.

The E-UTRAN 1110 enabled for CS Fallback to 1xRTT may support additional functions such as provisioning control information that cause the UE to trigger 1xCS registration, forwarding 1xRTT CS paging requests to the UE, forwarding 1xRTT CS related messages between the MME and UE, releasing E-UTRAN resources after a UE leaves E-UTRAN coverage subsequent to a page for CS fallback to 1xRTT CS if PS handover procedure is not performed in conjunction with 1xCS fallback, and invoking the optimized or non-optimized PS handover procedure concurrently with enhanced 1xCS fallback procedure when supported by the network and UE and based on network configuration.

Also illustrated in FIG. 11 is an 1xRTT MSC 1114 providing communication between the 1xRTT CS access 1116 and the 1xCS IWS 1108. FIG. 11 also illustrates a serving/PDN GW 1112 connected to both the E-UTRAN 1110 and the MME 1104.

1xCSFB provides a mechanism to support 1x circuit services while a User Equipment (UE) camps on Evolved UMTS Terrestrial Radio Access Network (E-UTRAN). The Enhanced 1xCFSB (e1xCSFB) is designed based on a traffic channel assignment procedure through a tunnel developed for Single Radio Voice Call Continuity (SRVCC). In order to speed up a 1x call set up time, the Universal Handoff Direction Message (UHDM) can be assumed to be sent to the UE for 1x traffic channel assignment. The Extended Channel Assignment Message (ECAM) may also be used, but requires service negotiation after the UE transitions to 1x.

FIG. 12 illustrates exemplary aspects of pre-registration using an exemplary EPS procedure. Initially, a UE 1202 attaches to E-TRAN 1204 and thus to MME 1206 as specified in TS 23.401, as indicated at 1212. If supported, the UE 1202 may include an indication of enhanced CS Fallback to 1xRTT and may also include concurrent 1xRTT and HRPD PS session handling capabilities as part of the UE radio capabilities.

Based on a radio layer trigger (e.g. an indication from the E-UTRAN when the UE is in a connected state or an indication over a broadcast channel), the UE decides to register with the 1xRTT CS domain at 1214.

If the UE is in an idle state, in order to create a signally connection with the MME, the UE performs a Service Request procedure at 1216. The UE then generates a 1xRTT CS registration request at 1218a-c. This includes the 1xRTT CS message being transferred from the UE to the E-UTRAN at 1218a, the E-UTRAN forwarding the 1xRTT CS message to the MME including the CDMA2000 Reference Cell ID at 1218b, and the MME selecting a 1xCS IWS node based on the CDMA2000 Reference Cell ID at 1218c. The IMSI is used to distinguish S102 signaling transactions belonging to different UEs. The MME sends a S102 direct transfer message (IMSI, 1xCS message) to the 1xCS IWS node 1208.

At 1220, 1xRTT CS registration is performed by the 1xCS IWS node based on the registration procedure defined in 3GPP2 A. S0013-D. A location update is sent between the 1xCS IWS and the 1xRTT MSC 1210.

Then, in 1222a-c, a 1xRTT CS registration response is sent between the 1xCS IWS and the UE. At 1222a, the 1xRTT CS registration response is tunneled back to the MME in a S102 Direct Transfer message (IMSI, 1xCS message). At 1222b, the MME forwards the 1xRTT CS message to the UE. At 1222c, the E-UTRAN forwards the 2xRTT CS message to the UE. If the triggers for 1xCS registration change over time, the UE whether in an idle or connected state, may use this information to update the 1xCS registration via the tunnel.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be non-transitory, and which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for reducing an amount of time for reporting a measurement report message after sending a completion message for a transfer from a first Radio Access Technology (RAT) to a second RAT in wireless communication, the method comprising:
   monitoring a first RAT;
   receiving an indication on a second RAT;
   prior to a transfer from the first RAT to the second RAT based on the indication:
      receiving neighbor information for the second RAT via the first RAT,
      searching an environment based on the neighbor information, and
      generating a first neighbor list based on the neighbor information;
   performing the transfer from the first RAT to the second RAT; and
   after the transfer:
      receiving a second neighbor list via the second RAT,
      comparing the first neighbor list to the second neighbor list to determine an active neighbor list, and
      configuring the measurement report message based on the determined active neighbor list, wherein the transfer includes an x-way soft handoff based on a fast neighbor scan of the neighbor information that results in a soft handoff status and the x in the x-way soft handoff comprises an integer equal to or greater than 1.

2. The method according to claim 1, further comprising: prior to the transfer, preparing to report neighbors in the first neighbor list.

3. The method according to claim 1, wherein the neighbor information is received as broadcasted information from the first RAT.

4. The method according to claim 3, wherein the broadcasted information from which the neighbor information is received includes System Information Block 8 (SIB8) reselection parameters.

5. The method according to claim 1, wherein the active neighbor list is determined based at least on removing neighbors from the first neighbor list that are not included in the second neighbor list.

6. The method according to claim 1, wherein the neighbor information includes a neighbor list from the second RAT that is tunneled via the first radio access technology prior to the transfer.

7. The method according to claim 6, wherein the neighbor list is sent along with a handoff message.

8. The method according to claim 6, further comprising: prior to the transfer, preparing to report neighbors in the neighbor list.

9. The method according to claim 1, wherein the first RAT is Long Term Evolution (LTE) and the second RAT is 1x.

10. The method according to claim 1, further comprising: sending the measurement report message to the second RAT after a transfer completion, wherein the neighbor information is measured via the first RAT.

11. At least one processor configured to reduce an amount of time for sending a measurement report message after sending a completion message for a transfer from a first Radio Access Technology (RAT) to a second RAT in wireless communication, the processor comprising one or more modules configured for:
   monitoring a first RAT;
   receiving an indication on a second RAT;
      prior to a transfer from the first RAT to the second RAT based on the indication:

receiving neighbor information for the second RAT via the first RAT, search an environment based on the neighbor information, and generating a first neighbor list based on the neighbor information;

performing the transfer from the first RAT to the second RAT; and after the transfer:

receiving a second neighbor list via the second RAT, comparing the first neighbor list to the second neighbor list to determine an active neighbor list, and configuring the measurement report message based on the determined active neighbor list, wherein the transfer includes an x-way soft handoff based on a fast neighbor scan of the neighbor information that results in a soft handoff status and the x in the x-way soft handoff comprises an integer equal to or greater than 1.

12. A computer program product for reducing an amount of time for sending a measurement report message after sending a completion message for a transfer from a first Radio Access Technology (RAT) to a second RAT in wireless communication, comprising:

a non-transitory computer-readable medium comprising a code for causing a computer to:

monitor a first RAT;

receive an indication on a second RAT;

prior to a transfer from the first RAT to the second RAT based on the indication:

receive neighbor information for the second RAT via the first RAT, search an environment based on the neighbor information, and generate a first neighbor list based on the neighbor information;

perform the transfer from the first RAT to the second RAT; and after the transfer:

receive a second neighbor list via the second RAT, compare the first neighbor list to the second neighbor list to determine an active neighbor list, and configure the measurement report message based on the determined active neighbor list, wherein the transfer includes an x-way soft handoff based on a fast neighbor scan of the neighbor information that results in a soft handoff status and the x in the x-way soft handoff comprises an integer equal to or greater than 1.

13. An apparatus for reducing an amount of time for sending a measurement report message after sending a completion message for a transfer from a first Radio Access Technology (RAT) to a second RAT in wireless communication, the apparatus comprising:

means for monitoring a first RAT;

means for receiving an indication on a second RAT;

means for receiving neighbor information for the second RAT via the first RAT prior to a transfer from the first RAT to the second RAT based on the indication;

means for searching an environment based on the neighbor information;

mean for generating a first neighbor list based on the neighbor information;

means for performing the transfer from the first RAT to the second RAT;

means for receiving a second neighbor list via the second RAT after the transfer;

means for comparing the first neighbor list to the second neighbor list to determine an active neighbor list; and means for configuring the measurement report message based on the determined active neighbor list, wherein the transfer includes an x-way soft handoff based on a fast neighbor scan of the neighbor information that results in a soft handoff status and the x in the x-way soft handoff comprises an integer equal to or greater than 1.

14. An apparatus for reducing an amount of time for sending a measurement report message after sending a completion message for a transfer from a first Radio Access Technology (RAT) to a second RAT in wireless communication, the apparatus comprising:

a monitoring component configured to monitor a first RAT;

a receiver configured to receive an indication on a second RAT and to receive neighbor information for the second RAT via the first RAT, prior to a transfer from the first RAT to the second RAT based on the indication; and a processor configured to:

search an environment based on the neighbor information prior to the transfer, generate a first neighbor list based on the neighbor information, transfer from the first RAT to the second RAT, receive a second neighbor list via the second RAT, compare the first neighbor list to the second neighbor list to determine an active neighbor list, and configure the measurement report message based on the determined active neighbor list, wherein the transfer includes an x-way soft handoff based on a fast neighbor scan of the neighbor information that results in a soft handoff status and the x in the x-way soft handoff comprises an integer equal to or greater than 1.

15. The apparatus according to claim 14, wherein the processor is further configured to:

prepare to report neighbors in the first neighbor list, prior to the transfer.

16. The apparatus according to claim 14, wherein the neighbor information is received as broadcasted information from the first RAT.

17. The apparatus according to claim 16, wherein the broadcasted information from which the neighbor information is received includes System Information Block 8 (SIB8) re-selection parameters.

18. The apparatus according to claim 14, wherein the processor is further configured to determine the active neighbor list based at least on removing neighbors from the first neighbor list that are not included in the second neighbor list.

19. The apparatus according to claim 14, wherein the neighbor information includes a neighbor list from the second RAT that is tunneled via the first radio access technology prior to the transfer.

20. The apparatus according to claim 19, wherein the neighbor list is sent along with a handoff message.

21. The apparatus according to claim 19, wherein the processor is further configured to:

prepare to report neighbors in the neighbor list, prior to the transfer.

22. The apparatus according to claim 14, wherein the first radio access technology is Long Term Evolution (LTE) and the second RAT is 1x.

23. The apparatus according to claim 14, further comprising:

a transmitter configured to send the measurement report message to the second RAT after a transfer completion, wherein the neighbor cell information is measured via the first RAT.

* * * * *